United States Patent [19]
Penick

[11] 3,785,260
[45] Jan. 15, 1974

[54] HAMMER-DRIVEN SHUTTER AND PERCUSSION IGNITION SYSTEM
[75] Inventor: Ib Penick, Wheeling, Ill.
[73] Assignee: Simpro Corporation of America, Englewood Cliffs, N.Y.
[22] Filed: Nov. 9, 1972
[21] Appl. No.: 305,179

Related U.S. Application Data
[63] Continuation-in-part of Ser. No. 229,355, Feb. 25, 1972, Pat. No. 3,747,492.

[52] U.S. Cl. .................. 95/11.5 R, 95/11 L, 95/60, 240/1.3
[51] Int. Cl. ............................................. G03b 9/70
[58] Field of Search ...................... 95/11.5 R, 11 L, 95/DIG. 1, 62, 60, 59; 240/1.3

[56] References Cited
UNITED STATES PATENTS
1,867,109  7/1932  Seifert................................. 95/60
3,680,454  4/1971  Lange................................. 95/11 L
3,628,431  12/1971  Irwin................................. 95/11.5 R

*Primary Examiner*—Richard L. Moses
*Attorney*—Samuel J. Stoll et al.

[57] ABSTRACT

A hammer-driven shutter and flashlamp igniting system for cameras adapted for use with percussion-ignitable flash-lamps. The shutter system consists of two overlapping shutterblades which co-act to open the camera exposure aperture radially outwardly from the center, and co-act to close the camera exposure radially inwardly toward the center. A flashlamp firing pin is integral with one of said shutter-blades, and it is movable into and out of percussion igniting position in synchronization with the operation of said shutter-blade.

7 Claims, 13 Drawing Figures

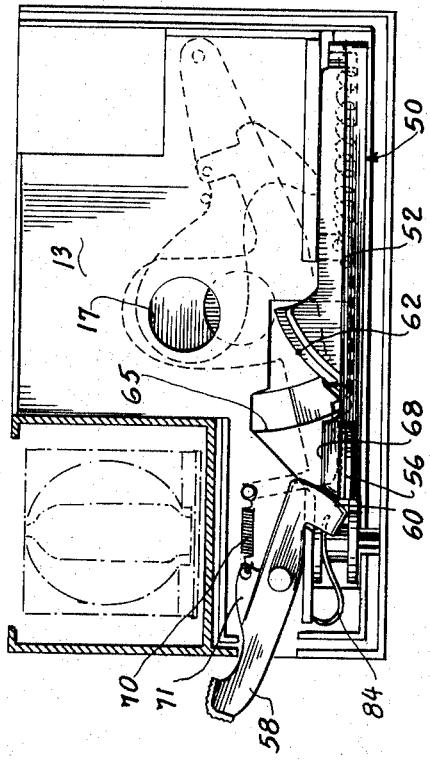
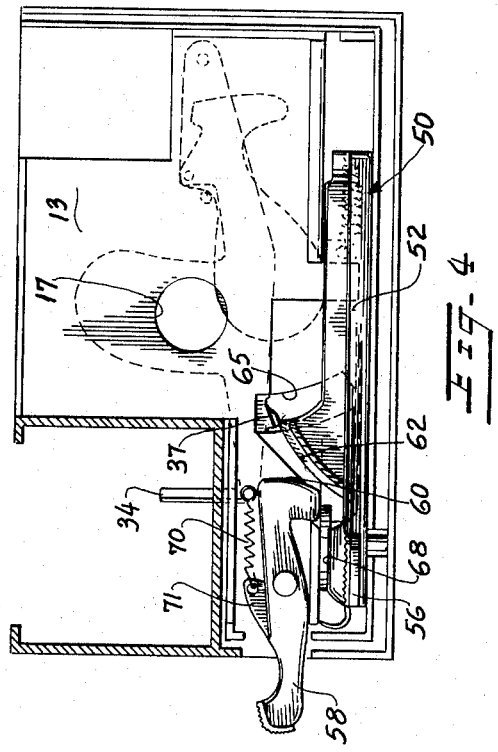
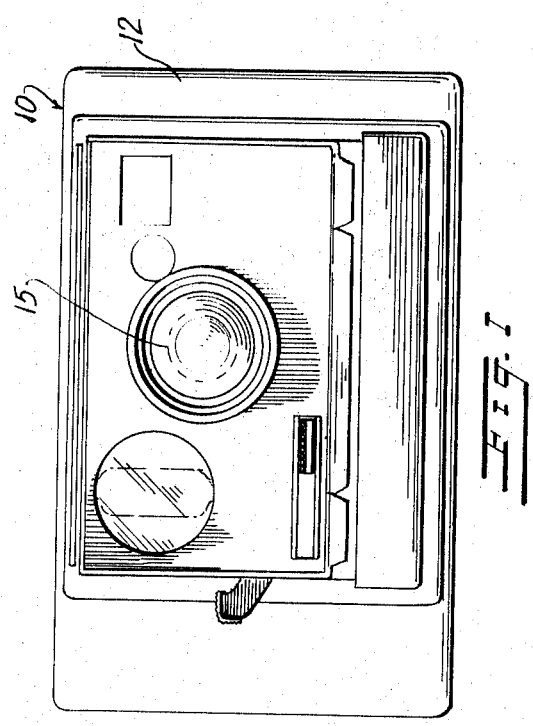
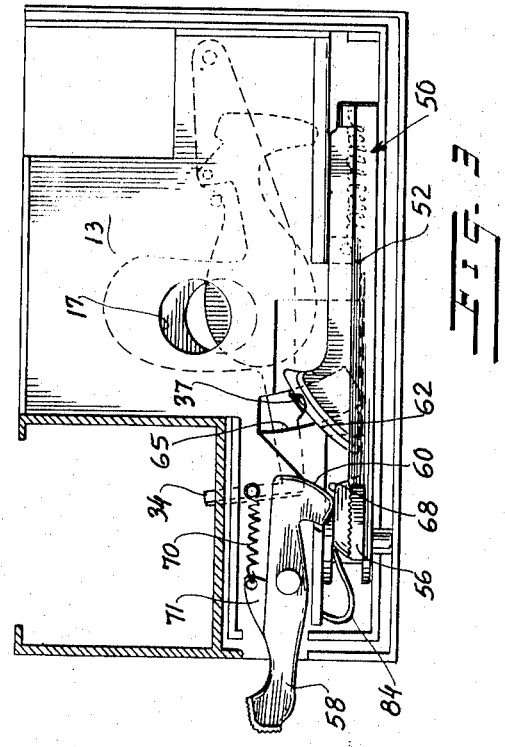

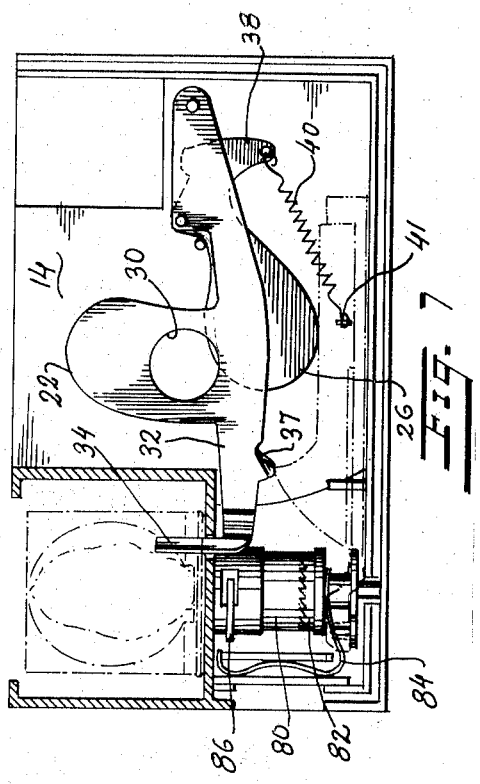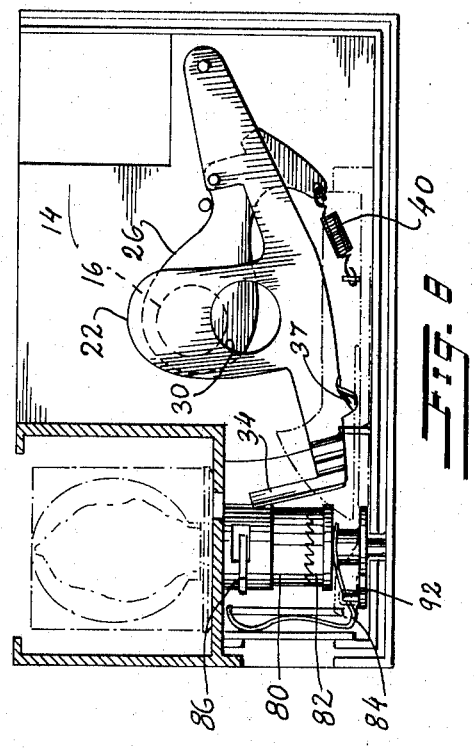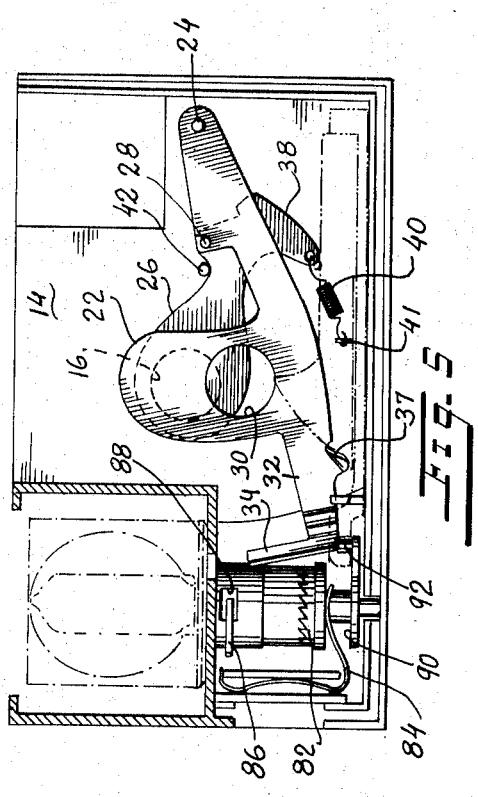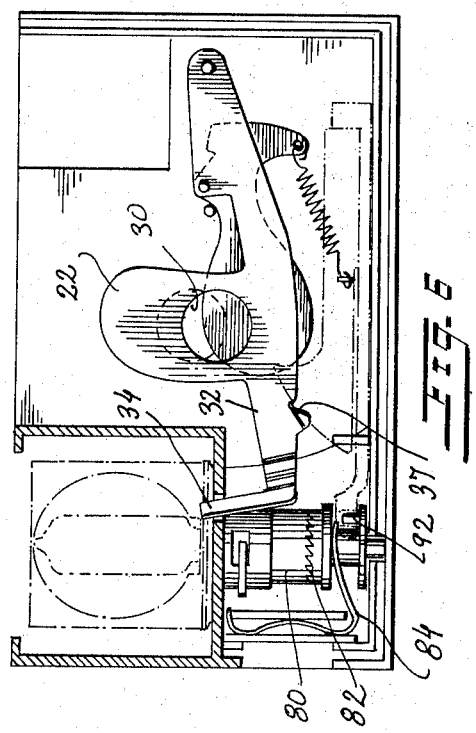

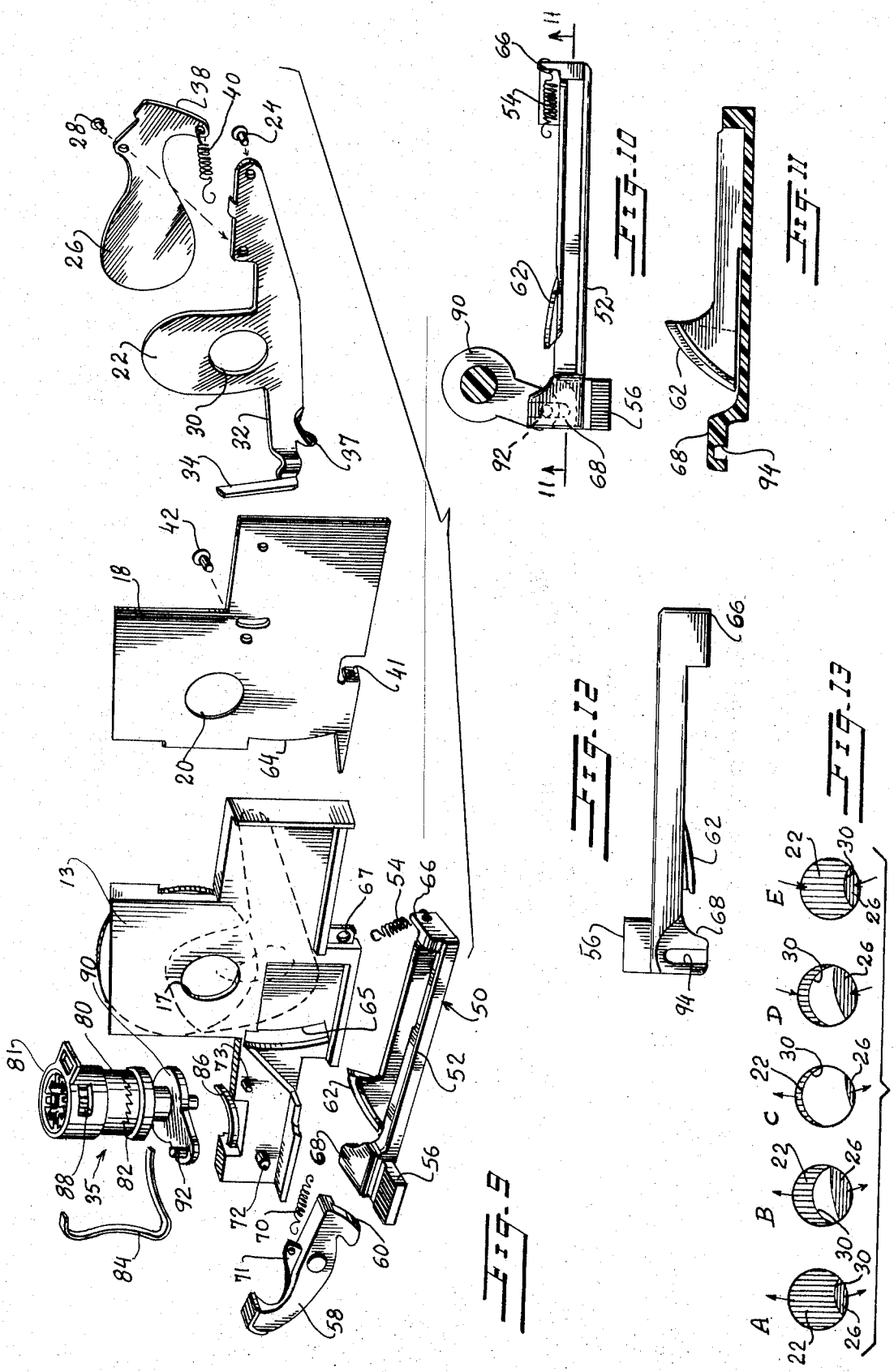

HAMMER-DRIVEN SHUTTER AND PERCUSSION IGNITION SYSTEM

REFERENCE TO RELATED PATENT APPLICATION

This patent application is a continuation-in-part of a co-pending patent application, Ser. No. 229,355, filed by the present applicant on Feb. 25, 1972 now U.S. Pat. No. 3,747,492.

BACKGROUND OF THE INVENTION

1. Field of the Invention

This invention relates to camera which are adapted to use percussion-ignitable flash-lamps.

2. Description of the Prior Art

The closest prior patent art known to applicant is represented by the following United States patents and references cited therein:

William T. Colville U.S. Pat. No. 3,528,353

Chester W. Michatek U.S. Pat. No. 3,576,156

Donald M. Harvey U.S. Pat. No. 3,584,556

Existing systems, as exemplified by these patents, are complicated and costly. They consist of separate assemblies of parts which are interconnected mechanically and functionally. For example, they have separate shutter, ignition and hammer mechanisms which are synchronously interconnected, as well as interconnected flashcube advancing (rotating) means.

The interconnecting mechanisms are elaborate in order to maintain exact synchronization between exposure of the film and ignition of the flashlamp. Since ignition normally precedes exposure by milliseconds, there is little time tolerance between these operations. In some cases a delay mechanism in the firing system slows the shutter operation down when a flashlamp is used, for example, from 0.125 to 0.090 of a second.

Conventional flashlamps are made in the form of flashcubes (four flashlamps per cube) and a mechanism is provided for sequentially rotating the cube in synchronization with the film exposing and flashlamp igniting operations. In some instances the firing pin is prevented from operating in the absence of a flashcube, in other instances warning flags are provided to signal a spent flashlamp.

In all cases a series of complicated, interconnected mechanisms is provided, consisting of some 30 to 50 separate component parts.

SUMMARY OF THE INVENTION

It is an important object of this invention to provide a shutter and flashlamp igniting system which is simple in mechanism and operation, comprising relatively few component parts which are easily and quickly assembled, and relatively inexpensive in terms of materials and labor.

It is also an important object of the invention to provide a shutter and flashlamp igniting system which is relatively fool-proof in operation in the hands of both skilled and unskilled photographers.

The present invention provides a low-cost system which is intended for incorporation into a low-cost camera, e.g., a low-cost camera adapted to use and process self-developing film commonly sold under the trademark POLAROID.

More particularly, a shutter and flashlamp igniting system in accordance with the present invention consists of only four spring-biased parts which, in conjunction with the camera proper, perform two basic functions: (a) exposure of film, and (b) ignition of a flashlamp in synchronization therewith. These four spring-biased parts are:

1. A shutterblade integrally combined with a firing pin,
2. a second shutterblade which co-acts with the first shutterblade,
3. a hammer which drives the first shutterblade with its firing pin, said hammer being integrally combined with a reset handle, and
4. a trigger which is integrally combined with a sear lock to hold the hammer in cocked, spring-loaded position.

An important feature of the invention resides in the relatively short travel distance of the first shutterblade and the relatively short travel distance of the firing pin. This is significant since a relatively long range of firing pin travel would conflict with the physical limitation of conventional percussion-type flashcubes.

BRIEF DESCRIPTION OF THE DRAWING

FIG. 1 is a front view of a camera embodying the hammer-driven shutter and percussion ignition system of the present invention.

FIG. 2 is a view of the front of the camera after the front camera wall and optical assembly have been removed therefrom, said view being partially in vertical section to delete the flash cube holder from the view. The shutter assembly is shown in closed, cocked position in this view.

FIG. 3 is a view similar to that of FIG. 2, showing the shutter assembly in partially open position following actuation of the trigger. The firing pin is also shown in this view at the starting phase of its travel into firing position.

FIG. 4 is a view similar to that of FIGS. 2 and 3, but showing the shutter assembly in completely open position and also showing the firing pin in firing position.

FIG. 5 is a view similar to that of FIG. 2 after the inner camera wall is removed, this view showing the shutter mechanism is closed, cocked position and also the flash cube holder in static position preparatory to firing of one of the flash lamps.

FIG. 6 is a view similar to that of FIG. 3, showing the shutter mechanism in partially open position and the firing pin commencing to move into firing position.

FIG. 7 is a view similar to that of FIG. 4, showing the shutter mechanism in fully open position and the firing pin in firing position.

FIG. 8 is a view similar to that of FIG. 7, except that it shows the shutter mechanism back in closed position and the firing pin back in retracted position following exposure of the film.

FIG. 9 is an exploded perspective view showing the several parts of the shutter assembly, including the firing pin, the flash cube holder, including the means for rotating same, and the trigger and hammer elements.

FIG. 10 is a top view of the hammer element, including the reset means and the connection to the flash cube holder.

FIG. 11 is a longitudinal section through said hammer element, said section being taken on the line 11—11 of FIG. 10.

FIG. 12 is a view of the underside of said hammer element.

FIG. 13 is a series of views showing five phases in the operation of the shutter mechanism, wherein phase A shows the shutter mechanism in closed position, phase B shows it beginning to open, phase C shows it in almost fully open position, phase D shows it beginning to close, and phase E shows it again in fully closed position.

DESCRIPTION OF PREFERRED EMBODIMENT OF THE INVENTION

Camera 10 has a housing (camera body) 12, with a front mounting plate 13 on which the optical system 15 is mounted and an inner wall or partition 14 in which the camera exposure aperture 16 is formed. A registering aperture 17 is formed in front mounting plate 13 for registration with exposure aperture 16. Between said front mounting plate 13 and said inner wall or partition is an intermediate mounting plate 18 and an aperture 20. This aperture registers with apertures 16 and 17 above mentioned. As will be seen, the hammer-drive mechanism is mounted on the front mounting plate 13, and the shutter blade mechanism is mounted on the intermediate mounting plate 18, and the flashcube holder is mounted in the camera body adjacent the inner wall or partition 14.

Specifically, shutterblade 22 is pivotally mounted on said intermediate mounting plate 18 by means of pin 24, and a second shutterblade 26 is pivotally mounted on shutterblade 22 by means of pin 28. Shutterblade 22 has a circular opening 30 formed therein for registration with exposure aperture 16 and registering openings 17 and 20 to expose the film. Shutterblade 22 has an extension piece 32 projecting therefrom, integrally therewith, and firing pin 34 extends upwardly from said extension piece in the direction of flashcube holder 35 and flashcube 36 supported thereby. A detent 37 is formed on extension piece 32 for a purpose shortly to be described. It will be noted that detent 37 is a cam-faced element on both its forward and rearward sides.

Shutterblade 26 is disposed flat against shutterblade 22, which is disposed flat against mounting plate 18. It will be understood that the two shutterblades are movable in parallel planes, their respective pivotal axes (through pins 28 and 24) being perpendicular to said mounting plate 18 and said camera partition 14. Shutterblade 26 has a laterally projecting arm 38 to which one end of a spring 40 is attached. The opposite end of the spring is attached to mounting plate 18, specifically lug 41.

Shutterblade 26 with its lateral arm 38 defines a bellcrank. Spring 40 pulls upon said lateral arm and urges the shutterblade to pivot in clockwise direction (as viewed in the drawing) about pin 28. However, a limit pin or stud 42 on mounting plate 18 limits such clockwise movement and said limit pin or stud functions as a fulcrum relative to said shutterblade 26. Consequently, the pull exerted by spring 40 on arm 38 has the effect of drawing shutterblade 22 downwardly in counterclockwise direction about pin 24. Shutterblade 22 is thereby brought into closed position relative to the exposure apertures 17 and 20 in the two mounting plates and exposure aperture 16 in the camera partition, and the firing pin 34 is thereby held out of engagement with the flashcube.

Hammer-drive mechanism 50 comprises a bar 52 which is slidably mounted on mounting plate 13, a spring 54 which drives said bar, a reset handle 56 on said bar by which it is manually moved to spring-loaded position, a trigger 58 which includes a sear lock end portion 60 to hold bar 52 in spring-loaded position, and a cam-faced hammer element 62 on said bar 52 which is engageable with above mentioned detent 37 to drive the shutterblades.

It will be observed that hammer-drive mechanism is mounted on the front side of front mounting plate 13 while the shutter and firing mechanism is mounted on the back side of intermediate mounting plate 18. Hammer element 62 is engageable with detent 37 because said detent projects through a cutout 64 in mounting plate 18 and a slot 65 in mounting plate 13 into the path of said hammer element.

Spring 54 is attached at one end to a lug 66 formed at one end of bar 52 and the opposite end of said spring is attached to lug 67 on mounting plate 13. An abutment 68 is formed at the opposite end of said bar for engagement with sear lock portion 60 of the trigger. Another spring 70 is secured at one end to lug 71 on trigger 58 and at its opposite end to stud 73 on mounting plate 13. The trigger is thereby biased in clockwise direction (as viewed in the drawing) about pivot pin 72.

The operation of the above described mechanisms will now be explained. To load spring 54 and thereby clock the hammer-drive mechanism, hammer-drive bar 52 is moved manually, by means of reset handle 56, against the bias of said spring until abutment 68 of said bar clears sear lock portion 60 of trigger 58. Spring 70 will thereupon pivot the trigger in clockwise direction (as viewed in the drawing) about pin 72 until sear lock portion 60 locks behind said abutment. The hammer-drive mechanism is now in spring-loaded, cocked position.

When the trigger is actuated (pivoted in counterclockwise direction around pin 72), sear lock portion 60 will disengage abutment 68 and bar 52 will thereupon be thrust leftwardly (as viewed in the drawing) by action of loaded spring 54. This will drive cam-faced hammer element 62 against detent 37 of shutterblade 22 and cause said shutterblade to pivot upwardly about pin 24, carrying shutterblade 26 upwardly with it. But since the latter shutterblade 26 abuts limit pin 42, this upward movement will cause said shutterblade 26 to pivot downwardly about pin 28 as it moves upwardly.

The upward pivotal movement of shutterblade 22 will bring opening 30 therein into registration with exposure apertures 16, 17 and 20, while the downward pivotal movement of shutterblade 26 will uncover said exposure apertures. The reverse movement of the two shutterblades results when cam-faced hammer element 62 clears detent 37 and spring 40 is thereby free to act upon the shutterblades.

The opening and closing sequence of the two shutterblades 22 and 26 relative to exposure apertures 16, 20 and 17 is illustrated in sequential views A, B, C, D and E OF FIG. 13 of the drawing. View A shows the exposure apertures closed, the two shutterblades being shown in overlapping positions across said exposure apertures, and the arrows showing the directions in which the shutterblades are to move in order to uncover (open) the exposure apertures. View B shows the exposure apertures partly open as the two shutterblades begin their movement in opposite directions, said directions being also indicated by the arrows in that view. View C shows the apertures almost fully open and just before the two shutterblades reach the limits of their movements in the opposite directions indicated by the arrows. View D shows one phase in the closing movement of the two shutterblades, and the exposure apertures being shown partly closed following full exposure of the film. The arrows in View D show that each shutterblade has now reversed the direction of its movement. View E shows the exposure apertures entirely closed, since the two shutterblades are now back in their original overlapping positions across said exposure apertures. The arrows in View E show the directions of final movement of the shutterblades in closing the exposure apertues.

It will be evident from these views that the opening of the exposure apertures starts substantially at its center and progresses radially outward therefrom. Conversely, the closing of the exposure aperture progresses radially inwardly toward its center.

Resetting the hammer-drive mechanism requires manual movement of the hammer-drive bar 52 leftwardly (as viewed in the drawing) to load spring 54. This movement will bring the back face of hammer element 62 into engagement with the forward face of cam-faced detent 37. Hammer element 62 is resiliently mounted on hammer-drive bar 52, and as said hammer-drive bar 52 is moved rightwardly, said hammer element 62 will be cammed laterally by said detent 37 in order to bypass same. Once hammer element 62 clears said detent, the hammer element springs back to its original position, which is in line with the detent for engagement therewith when the trigger mechanism is actuated.

As has above been stated, firing pin 34 is integral with shutterblade 22. Consequently, when said shutterblade is thrust upwardly by hammer element 62 on spring-driven bar 52, firing pin 34 is driven upwardly into percussion engagement with a flashlamp ignition element in flashcube 36. This will ignite the flashlamp in synchronization with the operation of the shutterblades. The timing of the ignition may be determined by various factors, for example, the length of the firing pin and its radial distance from its pivotal axis (pin 24). A modification of either of these factors will change the ignition time.

The flashcube may be rotated manually or mechanically, that is, by the shutterblades-actuating mechanism above described. To illustrate the mechanical action, a first ratchet ring 80 may be connected to flashcube socket 81 and a second ratchet ring 82 may be rotatably mounted in the camera housing coaxially with the first ratchet ring. Ratchet ring 82 is also axially movable, to a limited degree, relative to ratchet ring 80, into and out of engagement therewith.

A first spring 84 biases said second ratchet ring 82 into engagement with first ratchet ring 80. A second spring 86 engages identations 88 in flashcube socket 81 and functions as an indexing pawl relative thereto. More specifically, there are four indentations 88 in socket 81, spaced 90° apart, and indexed in relation to the four flashlamps of a flashcube 36 mounted in said socket. The indexing spring pawl 86 is sequentially engageable with said identations, as the flashcube holder is cuased to rotate, in order to sequentially position the individual flashlamps relative to the firing pin of the ignition system.

The ratchet actuating means includes a crank arm 90 which is connected to the second ratchet ring 82. A pin 92 on said crank arm engages a socket 94 on the hammer-drive bar 52. When the hammer-drive bar is reset, that is, moved manually in rightwardly direction (as viewed in the drawing) the two ratchet wheels are in engagement and they are caused to advance 90°, thereby moving one of the flashlamps into firing position. The indexing pawl holds the flashcube socket in that position and when the hammer-drive bar moves in the opposite direction under the action of spring 54 the ratchet wheel 82 will slip relative to the ratchet wheel 80 without changing the position of said ratchet wheel 80 and, hence, of said flashcube socket. The flashcube is now in position for the next firing action.

The foregoing is descriptive of a preferred form of the present invention, and it will be understood that modifications of this form are included within the limitations of the appended claims.

I claim:

1. A shutter system for cameras having a film exposure aperture in a wall, said shutter system comprising:
   a. a first shutterblade which is mounted for pivotal movement relative to the exposure aperture in said wall,
   b. a second shutterblade which is carried by the first shutterblade and movable therewith,
   c. said second shutterblade being pivotally connected to said first shutterblade for pivotal movement relative thereto and relative to said exposure aperture,
   d. said first and second shutterblades being normally in overlapping positions relative to the exposure aperture to close same,
   e. actuating means causing said first and second shutterblades to pivot out of overlapping positions relative to said exposure aperture to open same,
   f. drive means which pivots the first shutterblade in a first direction, and
   g. limit means which engages the second shutterblade and causes it to pivot in the opposite direction while the first shutterblade pivots in the first direction.

2. A shutter system in accordance with claim 1, wherein:
   a. the second shutterback is spring biased in the first direction, and
   b. the first shutterblade is spring biased in the opposite direction,
   c. said drive means consisting of spring-biased hammer means engageable with the first shutterblade to cause it to pivot in said first direction and thereby to cause the second shutterblade to bear against the limit means and to pivot in said opposite direction.

3. A shutter system in accordance with claim 2, wherein:
   a. a trigger is movably mounted on adjacent said spring-biased hammer means,
   b. said trigger having sear lock means which locks the hammer means in cocked position against the spring bias,
   c. whereby actuation of the trigger disengages the sear lock means from the hammer means to release said hammer means for spring-thrust engagement with the first shutterblade,
   d. thereby causing the first and second shutterblades to pivot and to expose the film exposure aperture.

4. A shutter system in accordance with claim 3, wherein the spring-biased hammer means comprises:
   a. a hammer-drive bar mounted for longitudinal movement,
   b. a spring connected between said hammer-drive bar and the wall of the camera body,
   c. a reset handle on said hammer-drive bar for moving said bar relative to said wall to load said spring, and
   d. a cam-faced hammer element on said hammer-drive bar positioned for engagement with said first shutterblade.

5. A shutter system in accordance with claim 3, wherein the trigger comprises:
   a. a pivotally mounted spring-biased member,
   b. said sear lock means being provided on said pivotally mounted member on one side of its pivot, and
   c. trigger means provided on said pivotally mounted member on the opposite side of its pivot,
   d. said pivotally mounted member being pivotally movable in one direction to cause its sear lock means to engage said hammer means, and being pivotally movable in the opposite direction to cause the sear lock means to disengage the hammer means.

6. A shutter system in accordance with claim 3, wherein:
   a. the camera is provided with a flashcube holder adjacent the first shutterblade,
   b. said first shutterblade having a firing pin connected therewith for percussion engagement with a flashcube in said holder when the first shutterblade is spring-driven to film exposure aperture exposing position.

7. A shutter system in accordance with claim 6, wherein:
   a. the flashcube holder is rotatably mounted for sequentially advancing its individual flashlamps to firing position,
   b. a ratchet drive mechanism connected to said flashcube holder and operable by means of said hammer-drive bar, and
   c. indexing means connected to said flashcube holder for sequentially aligning its individual flashlamps with the firing pin.

* * * * *